Oct. 28, 1969 P. J. ALBERTI ET AL 3,474,609
MECHANICAL HARVESTER FOR TREE-BORNE FRUITS AND NUTS
Filed Dec. 6, 1966 8 Sheets-Sheet 3
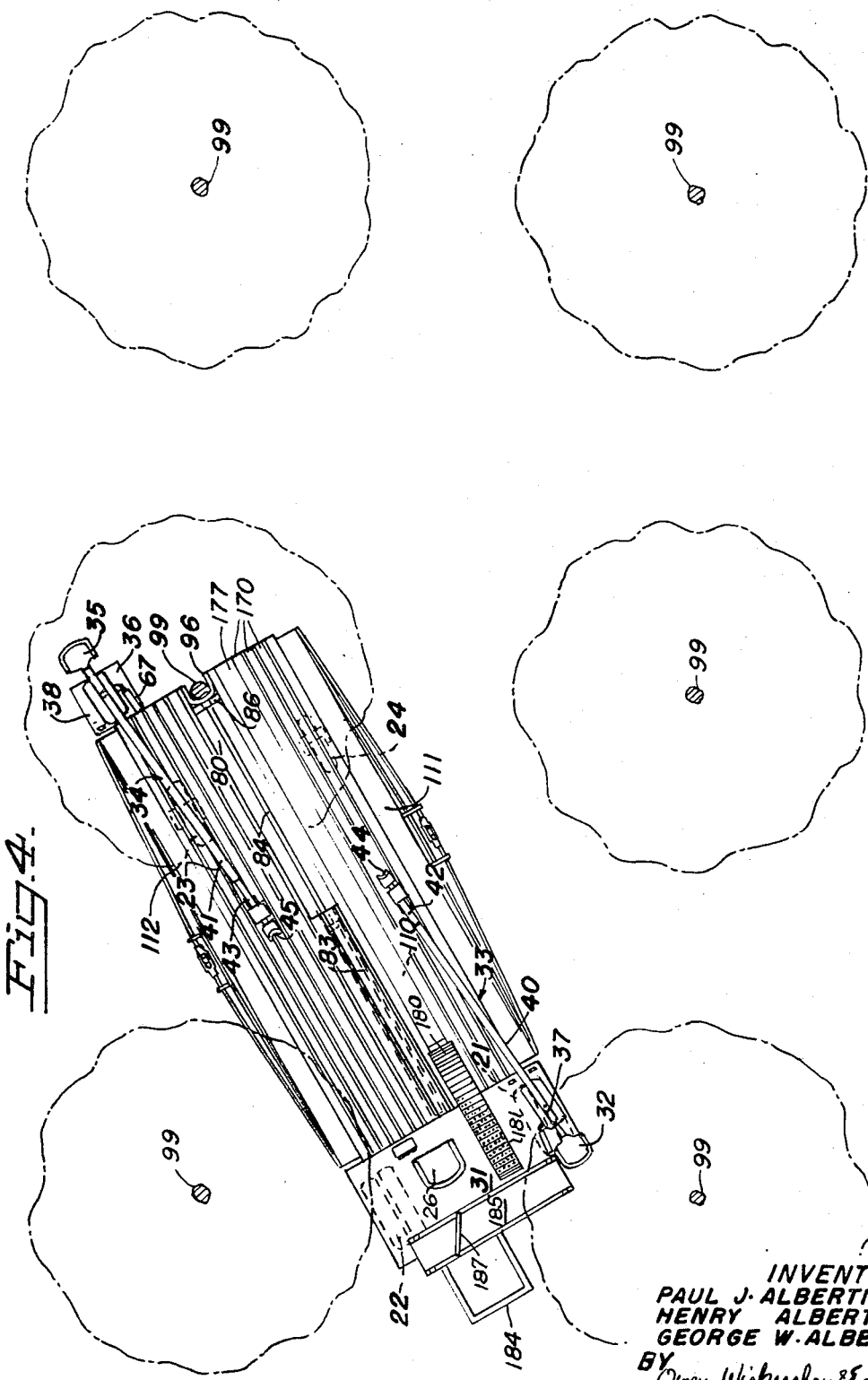
INVENTORS
PAUL J. ALBERTI
HENRY ALBERTI
GEORGE W. ALBERTI
BY
Owen, Wickersham & Erickson
ATTORNEYS

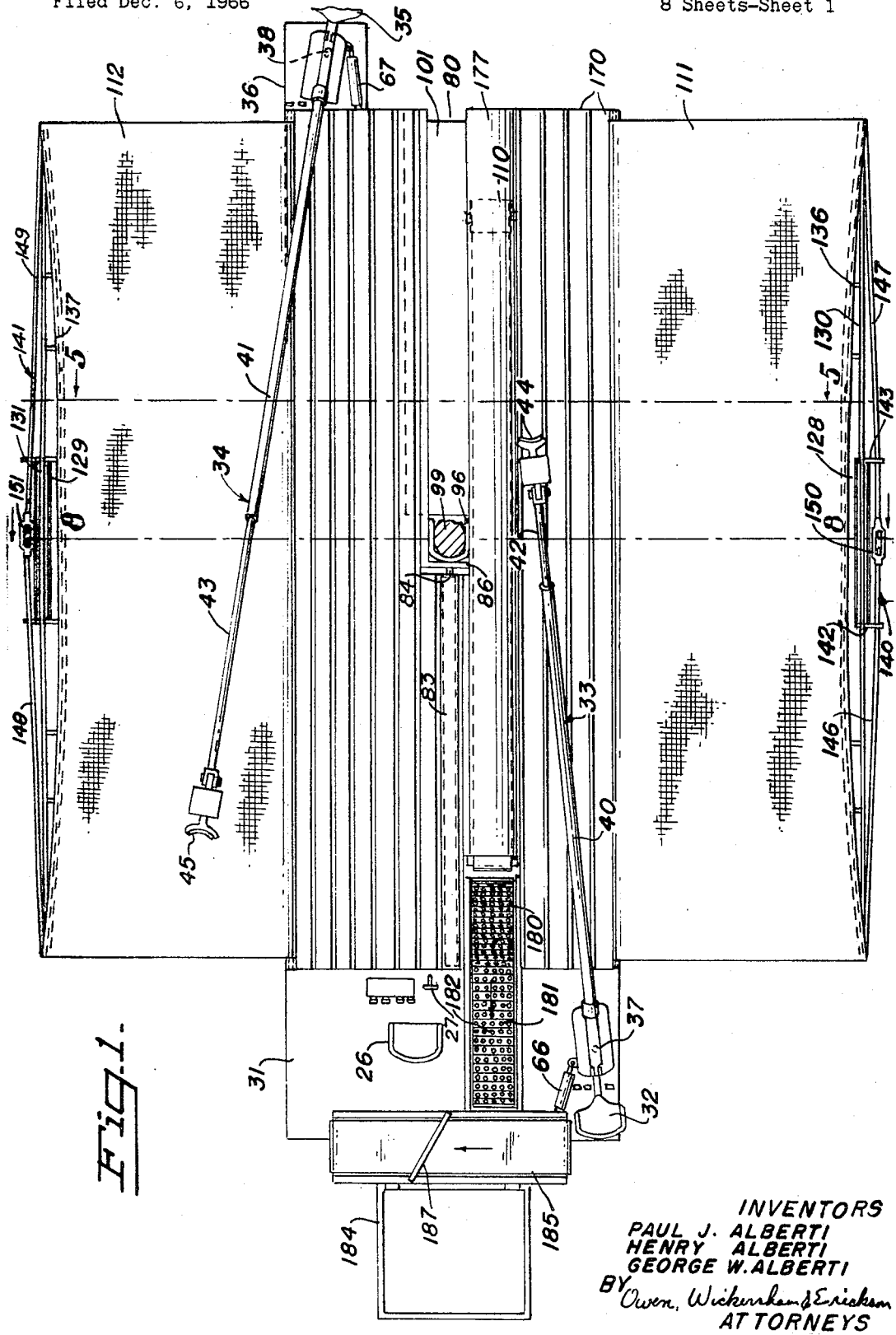

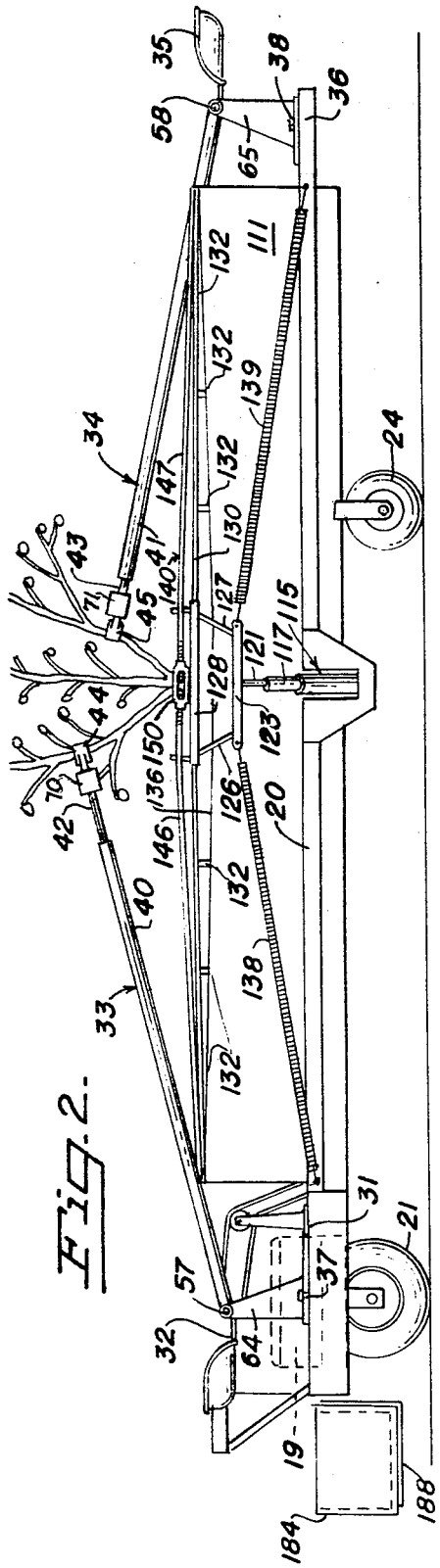

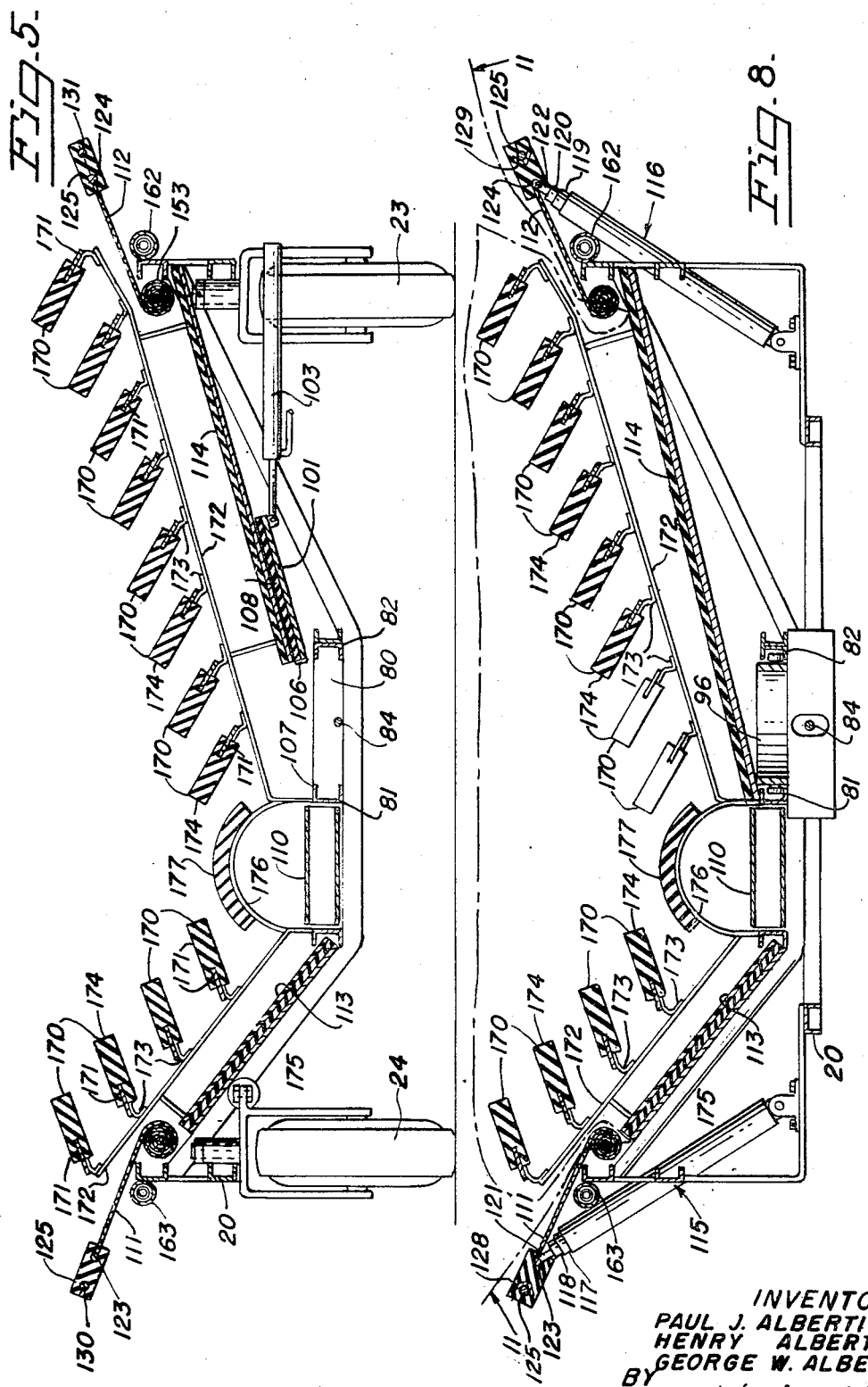

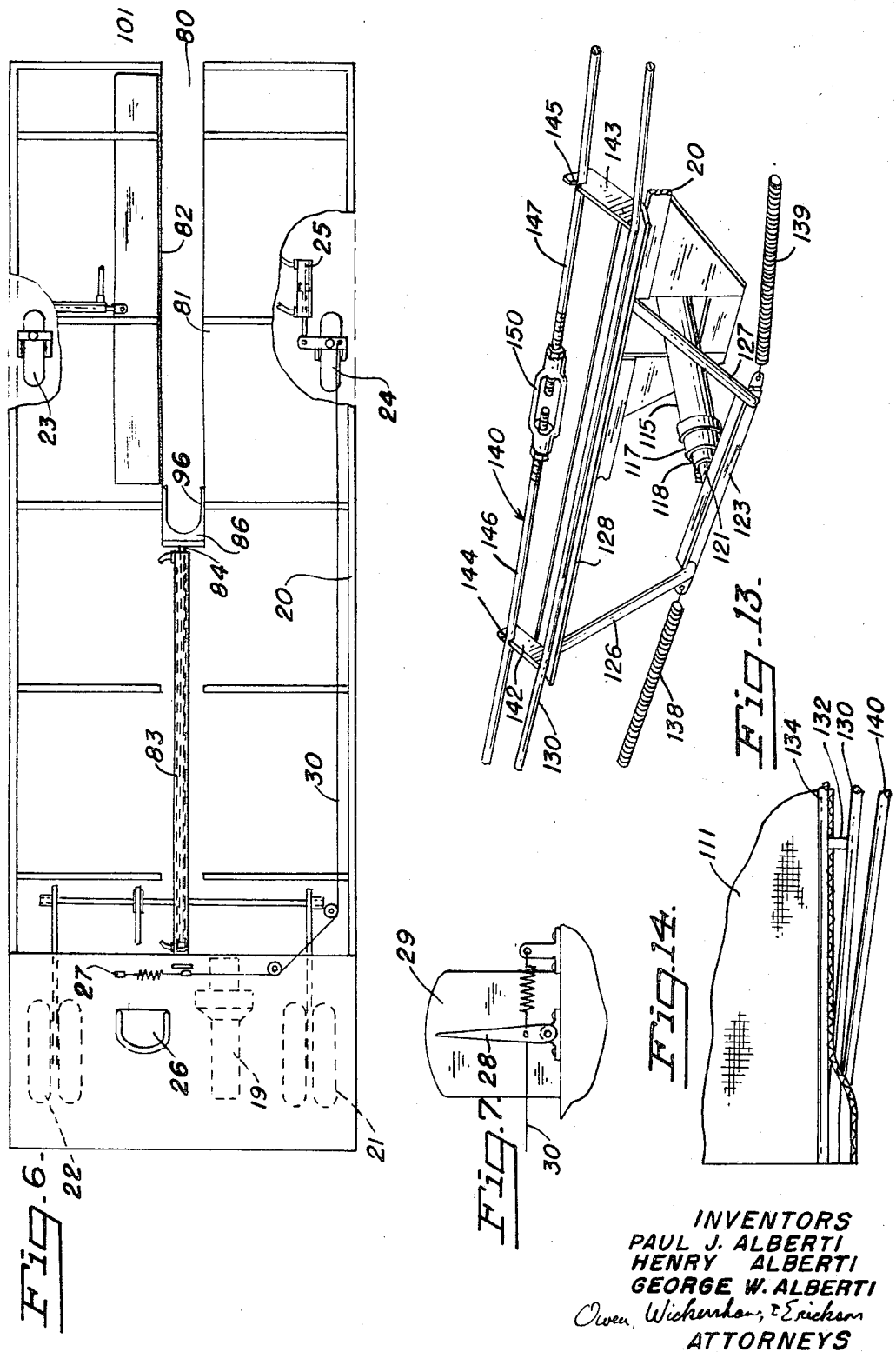

Oct. 28, 1969 P. J. ALBERTI ET AL 3,474,609
MECHANICAL HARVESTER FOR TREE-BORNE FRUITS AND NUTS
Filed Dec. 2, 1966 8 Sheets-Sheet 8
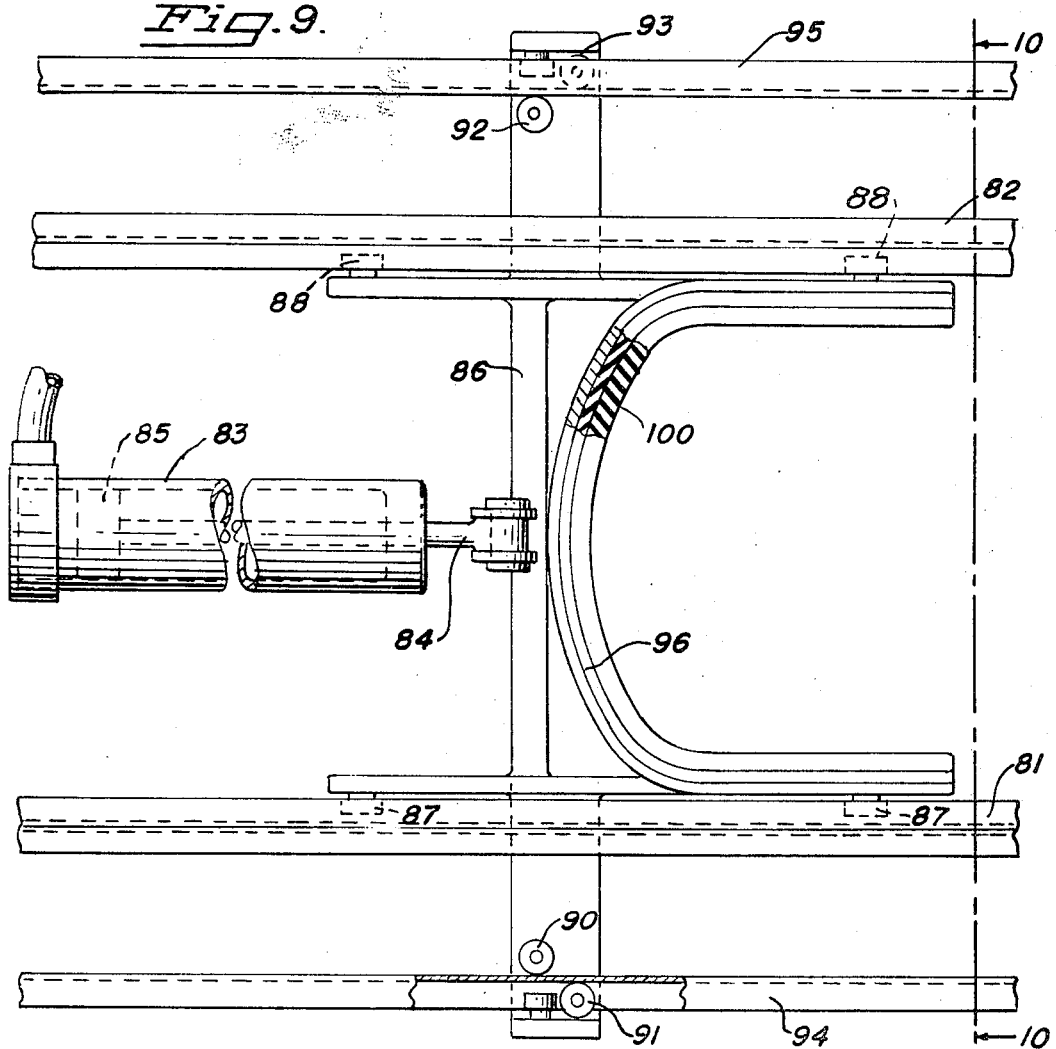
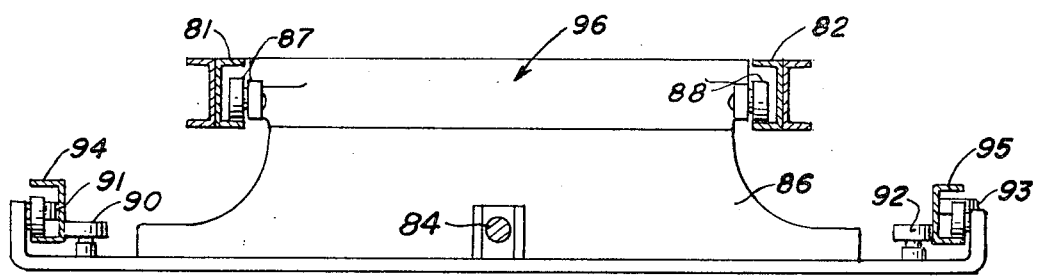
INVENTORS
PAUL J. ALBERTI
HENRY ALBERTI
GEORGE W. ALBERTI
BY Owen, Wickersham, & Erickson
ATTORNEYS

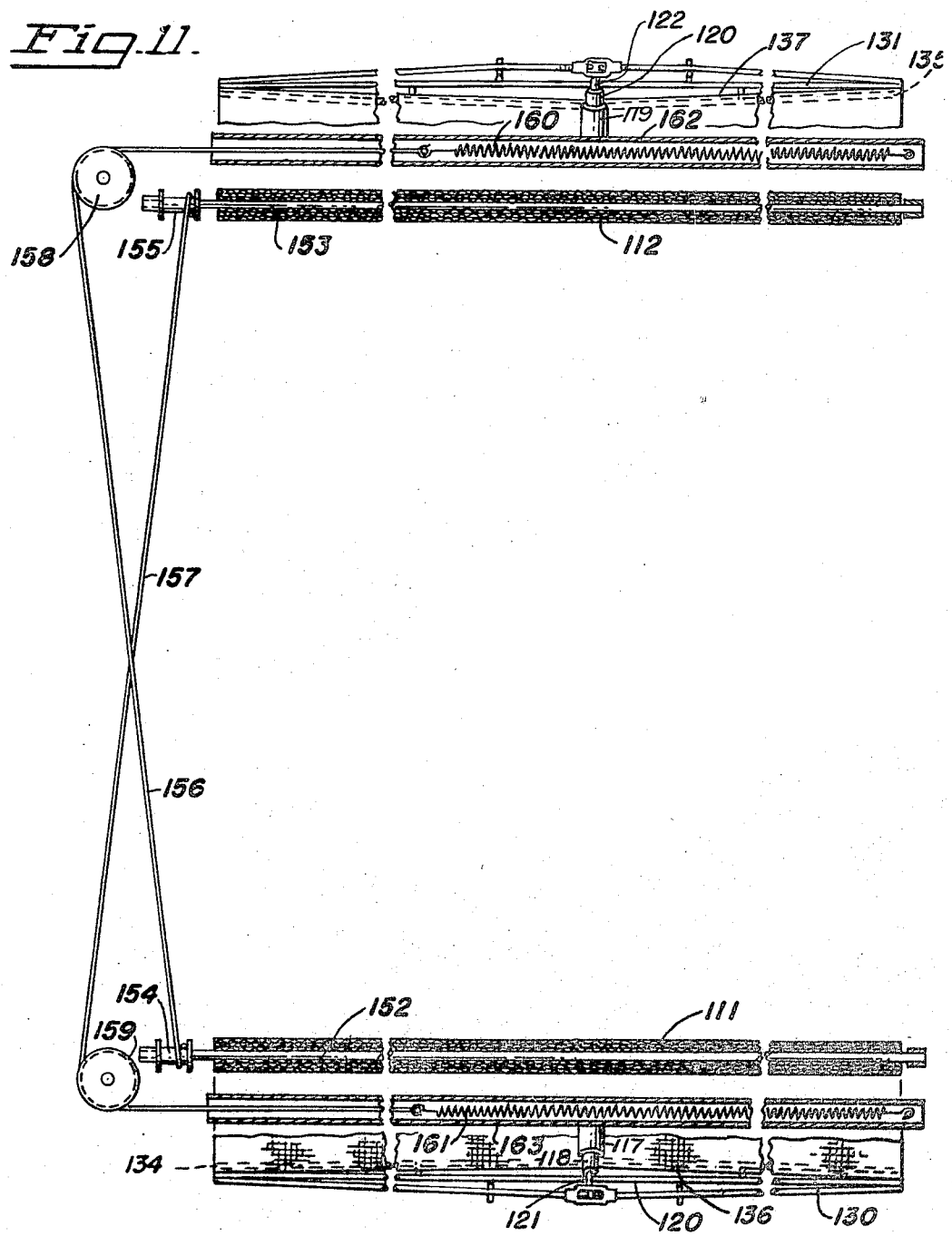

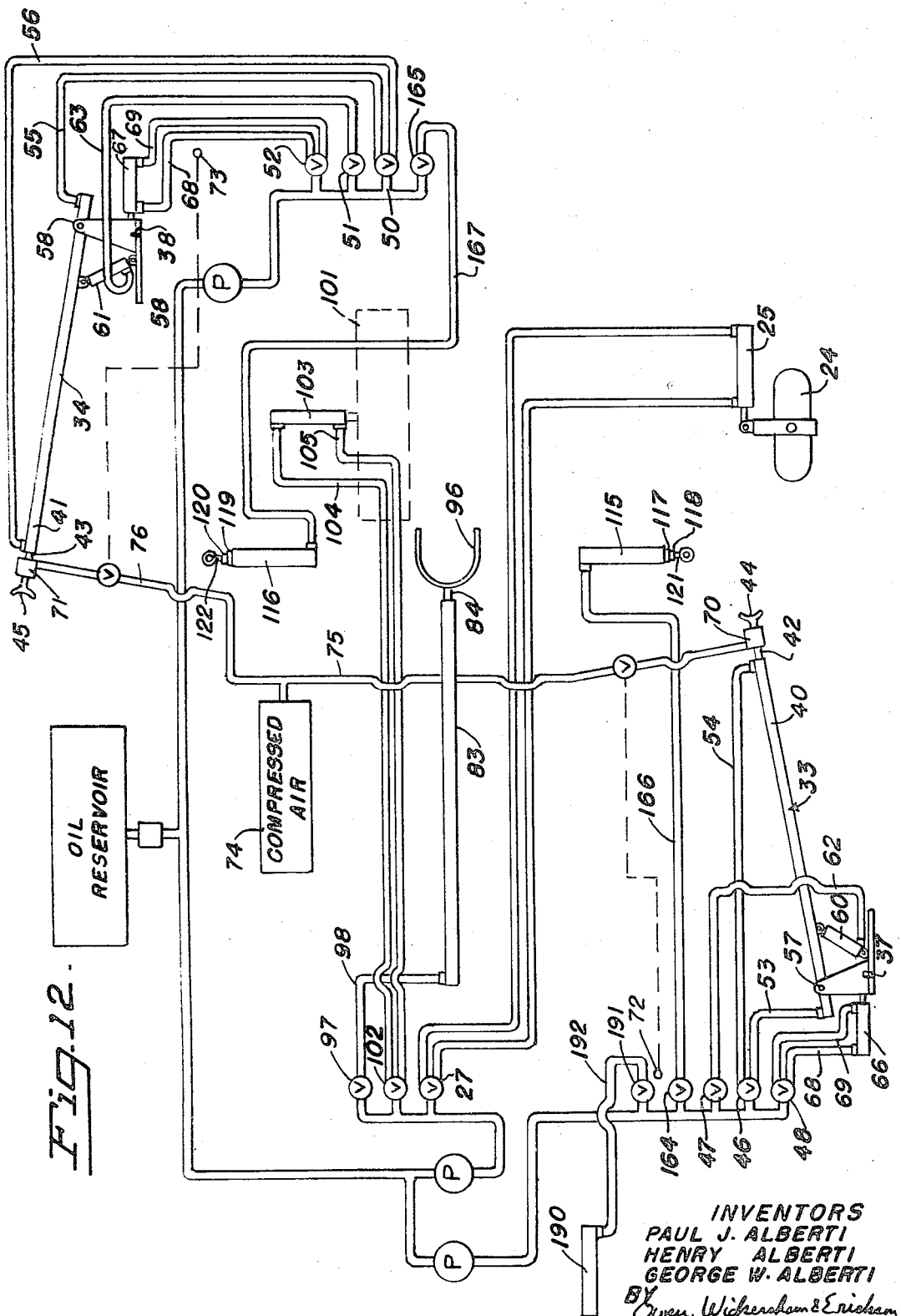

United States Patent Office 3,474,609
Patented Oct. 28, 1969

3,474,609
MECHANICAL HARVESTER FOR TREE-BORNE FRUITS AND NUTS
Paul J. Alberti, Rte. 2, 3701 Pioneer Road, Hughson, Calif. 95326; Henry Alberti, Rte. 3, Box 55, Chico, Calif. 95926; and George W. Alberti, 2406 Roberts Road, Turlock, Calif. 95380
Filed Dec. 6, 1966, Ser. No. 599,584
Int. Cl. A01g *19/06*
U.S. Cl. 56—329      26 Claims

ABSTRACT OF THE DISCLOSURE

Fruits and nuts are harvested by a self-propelled steerable vehicle having a long frame with a central open slot extending in from the forward end about half its length. A tree trunk engaging yoke, having a semi-encircling well-padded and cushioned collar, gently engages the trunk of a tree to be harvested, and a carriage, slidably mounted to the frame along the slot and normally urged to the front end of the frame, carries the yoke for fore-and-aft movement, so that the yoke is then pushed in by firm but gentle pressure to the rear end of the slot; hence the machine can engage a tree trunk and then advance and surround it by pushing against the trunk with the yoke while the frame advances. A substantially continuous fruit or nut catching area is provided over the frame, part of it being mounted movably to bridge the slot after the yoke is at the rear end of the slot. Part of the catching area is provided by extensible canvas members that are normally contracted and lie closely adjacent the side edges of the machine to give said machine a relatively narrow normal width, and are extended out laterally to give a wider catching area.

---

This invention relates to a mechanical harvester for tree-borne fruits and nuts.

The high cost and variability of manual labor, which has long predominated in the harvesting of peaches, apricots, almonds, and other stone fruits (drupes) and nuts, has led many inventors to attempt to provide varying degrees of mechanical harvesting. Various types of tree shakers and of devices for catching falling fruit have been proposed, and some have been used. However, mechanical harvesting of tree-borne crops has generally been inefficient and so has been accepted only in small degree, manual harvesting remaining responsible for the bulk of the crop. In spite of all the proposals heretofore, mechanical harvesting of drupes has been characterized as a slow speed operation which tends to bruise and damage the tree trunk and also to bruise and damage the fruit; a substantial number of laborers have had to participate, in order to maintain and operate the machines used; all these factors have resulted in a low-efficiency harvesting operation.

A general object of the present invention is to increase the speed, safety, and efficiency of picking and handling fruit and nuts by reducing the amount of labor required, by considerably reducing the bruising and other damage to the trees and to the fruit during harvest, and by greatly reducing the overall time of the operation.

One grave difficulty has been to surround the tree both quickly and without damage to the tree. It has been all too easy to strike the tree trunk and gash it. The present invention solves this problem by a novel structure, wherein a padded contact member first comes into engagement with the tree trunk and is then forced back gently by the resistance of the tree trunk as the machine moves forward, until the trunk is positioned at the center of the harvester. Also, the machine is provided with means for rapidly doubling its collection area after positioning and for reducing its size after harvesting the fruit preparatory to movement from that tree to the next tree, thereby giving increased maneuverability to the machine while also increasing the safety of maneuver.

A serious difficulty encountered by but not solved by mechanical harvesters heretofore in use has been the inability of their collectors to collect all the fruit that falls from the tree. Too small an area has been covered, and that area has often been incompletely covered, so that too small a percentage of full yield has been obtained. Often these prior-art devices have failed to fully surround the tree, and this has led to attempts to pick only part of the tree, resulting in a considerable drop loss from the portions of the tree not being picked. An alternative was to sacrifice speed to complete harvesting, and this heretofore led to extreme slowness.

In contrast, it is an object of the present invention to provide a mechanism for fully and rapidly surrounding the tree and catching the fruit over a considerable area around the tree, thereby enabling substantially full recovery of the ripe fruit.

The fruit damage problem has been a severe one, because the fruit has frequently had to drop onto mechanical elements, which tended to break the skin or bruise the fruit. Also, much of the fruit has landed on unyielding elements of has dropped so far that even though it fell into a freely supported portion of canvas, it was still bruised. Further, much of the fruit was damaged by fruit falling on fruit.

The answer of the present invention to this problem is a novel catching device which greatly reduces the distance through which much of the fruit falls, which provides for a greatly increased dampening of the fall of the other fruit, and which protects the fruit already fallen from direct falls of the fruit from the tree.

Another group of problems faced by mechanical harvesters heretofore in use has been the slowness of their operation, the requirement of a large number of laborers to practice it, and heavy reliance on much hand labor. Thus, the setting up of the machine at each tree has taken time, and the picking operation itself has tended to be slow and to consume much time overall. It took additional time to take the fruit-harvesting device away from one tree and to move it to the next tree. Mechanization was, in fact, usually attempted to only a small degree, because it could not be made to do the job. Hand picking remained more efficient, but the recent increases in labor cost, the generally reducing efficiency of the laborers and their increased unavailability have made it less attractive than ever and a weakness in the national economy.

The present invention speeds up the harvesting operation, to approach an ideal of approximately two minutes per tree in a properly spaced orchard. During this time the machine encircles the tree, shakes the fruit, collects it, grades it, and departs from the tree. These operations are carried out by a crew of three men on the machine and one additional man on the ground, who removes and replaces the tree props, where those are being used in the orchard, and exchanges filled bins of fruit for empty ones from time to time. If sorting is desired, one or two additional workers are usually enough to sort out the "split pits" and other defective fruit; so the entire picking crew can be made up of four to six men.

The present invention practically eliminates hand labor, especially in so far as the removal of the fruit from the tree and its collection and grading are concerned, the only hand labor being connecetd with the tree props, the exchange of bins, and, when done, the culling out of defective fruit.

Other objects and advantages of the invention will appear from the following description of a preferred form thereof.

In the drawings:

FIG. 1 is a top plan view of a harvester embodying the principles of the invention, a small portion at the right end being broken off because of insufficient space on the sheet. The tree trunk is shown in section, and the harvester is shown in its fully spread operating and collecting position.

FIG. 2 is a view in side elevation of the harvester of FIG. 1 in use, except for omission of the operating crew.

FIG. 3 is an enlarged fragmentary view in side elevation and partly in section of a portion of the harvester of FIG. 1, showing the conveyor system used.

FIG. 4 is a top plan view of the machine in an orchard showing how it approaches a tree trunk and how it can be used in relatively close spacing.

FIG. 5 is an enlarged view in elevation and in section taken along the line 5—5 in FIG. 4.

FIG. 6 is a top plan view of the machine shown in its transporting position, with the side canvases and louvers removed and its trunk-receiving slot open.

FIG. 7 is a fragmentary view in elevation of the indicating device which aids the driver in steering the wheel.

FIG. 8 is a view in section taken along the line 8—8 in FIG. 6.

FIG. 9 is a fragmentary enlarged top plan view, partly in section, of the tree-engaging yoke portion of the harvester.

FIG. 10 is a view in section taken along the line 10—10 in FIG. 9.

FIG. 11 is a fragmentary bottom plan view partly in section, taken along the line 11—11 in FIG. 8, showing the two canvas-spreading mechanisms and the interconnection between them.

FIG. 12 is a diagram of a hydraulic system which may be utilized in the invention for operation of various moving parts.

FIG. 13 is a fragmentary view in perspective of a portion of the support structure for the extendable side fruit catchers.

FIG. 14 is a fragmentary view of one end portion of one fruit catcher showing attachment to its support structure.

The harvester of this invention preferably comprises a main frame 20 (see FIGS. 2, 3, 5, and 6) mounted upon rear wheel assemblies 21 and 22 and front wheels 23 and 24. The frame may be about twenty-four feet long and about eight feet wide. Each rear wheel assembly 21 and 22 may comprise a pair of wheels driven, through a suitable transmission, by an internal combustion engine 19. The front wheel 23 (see FIG. 6) is preferably a simple idling caster, while the wheel 24 is used for steering, by means of a hydraulic cylinder 25 regulated from a driver's seat 26 by a lever-controlled valve 27 (see FIG. 12). A pointer 28 and dial 29 (FIG. 7) may be used in combination with a cable 30 to indicate to the driver whether the wheel 24 is pointed straight ahead or how much it is turned to the left or right.

At the rear end of the harvester, an elevated frame portion 31 (FIGS. 1-3) supports the seat 26 and a seat 32 at the right rear corner for a right-rear operator who controls one tree shaker 33 of two on the machine and also controls one of the two extendable canvas catchers 111, 112 discussed later. The second tree shaker 34 (and the other catcher) is controlled from the front end of the machine by a left-front operator seated on the seat 35, which is supported by a frame portion 36. The seats 32 and 35 are pivoted to their frames 31, 36 so that they can swing horizontally about their respective pivots 37, 38.

Each tree shaker 33, 34 comprises a long universally mounted hydraulic cylinder 40 or 41 whose pistons govern extensible arms 42, 43 with tree-engaging semi-circular collars 44 or 45 on their outer ends. The respective operators each use hydraulic valves 46, 47 and 48 or 50, 51, and 52 (see FIG. 12) to maneuver the collars 44 and 45 into engagement with suitable main branches of the tree. Thus, as shown in FIG. 12, each valve 46, 50 controls the flow of hydraulic fluid to opposite ends of its double-acting cylinder 40, 41 through conduits 53, 54 or 55, 56 to extend or retract the arm 42 or 43. The cylinders 40 and 41 may each be about seven feet long to give the assembly 33, 34 a retracted length of about eight feet, and the extended length of the assembly 33, 34 may be about fifteen feet. Each cylinder 40, 41 is mounted to pivot vertically about a pivot 57, 58, the valves 47 and 51 may be used to raise and lower their respective cylinders 40 and 41 through a respective single-acting cylinder 60, 61 and a conduit 62, 63. The pivots 57 and 58 are in brackets 64, 65 which are rigidly secured to the seats 32, 35 for horizontal swinging movement about the pivots 37, 38. This sidewise swinging movement of the seats 32, 35 and their tree-shaking assemblies 33, 34 is achieved by hydraulic cylinders 66, 67 operated by the valves 48, 52 through conduits 68 and 69.

The actual tree-shaking is done by a pneumatic vibrator 70, 71 at the collar 44, 45 like that used in a pneumatic hammer. The operators at the seats 32, 35 have a control lever 72, 73 for varying the intensity of the vibrator 70, 71, which are operated from the compressor 74 through conduits 75, 76.

The operators at the seats 32 and 35 each use the hydraulic systems under their control to position the collars 44, 45 against suitable tree limbs, then use their pneumatic systems to shake the tree limbs, and then use the hydraulic systems again to retract the collars 44, 45 from the tree and lower the tree-shakers 33 and 34 to suitable transporting positions.

The portion of the frame 20 forward of the portion 31 is made up of various lengthwise and widthwise members but on its forward half no widthwise members extend across the centerline, so that the forward half is provided with a longitudinal slot 80 about eighteen inches wide between a pair of longitudinal frame channel members 81 and 82. In line with the slot 80, the rear half of the frame 20 has a hydraulic cylinder 83 having a rod 84 attached to its piston 85. To the forward end of the rod 84 is attached a carriage 86 having two pairs of rollers 87 and 88 that respectively engage and roll in the channel members 81 and 82, as shown in FIGS. 9 and 10, and also having two pairs of rollers 90, 91 and 92, 93 that roll against and in channels 94 and 95 that are parallel to the channels 81 and 82. In order to assure stability widthwise and vertically, the rollers 87 and 88 are mounted vertically, while the rollers 90, 91 and 92, 93 are mounted horizontally and are on opposite sides of their respective channels 94 and 95. At the front of the carriage 86 is an approximately semicircular heavily padded tree-trunk-engaging yoke 96, preferably located about a foot above ground.

The cylinder 83 and rod 84 are part of a single-acting hydraulic ram which is preferably operated by the driver from his seat 26 by means of a valve 97 and a conduit 98. When the rod 84 is fully extended, the yoke 96 is at the front end of the harvester. In getting to harvesting position, the driver advances with the yoke 96 at the front end until the yoke 96 engages the tree trunk 99 with its cushioning padding 100. Then, with the hydraulic pressure off, forward movement of the frame 20 results in the tree trunk 99 pushing the yoke 96 back to its rearmost position in the middle of the frame, so that the tree trunk 99 is centered in the machine, both fore and aft and from side to side. Thus the tree trunk 99 is used to guide the machine, but with the pressure off and the yoke 96 padded, the trunk 99 is fully protected. This is an outstanding feature of this machine.

Across the slot 80 is then moved a rectangular, nearly horizontal, slightly sloped fruit-catching member 101, which is as long as the length of the slot 80 and is somewhat wider than the slot is wide. The driver may control it by a valve 102 (FIG. 12) which operates a two-way hydraulic device 103 through conduits 104 and 105. The device 103 is mounted on an incline perpendicular to the longitudinal axis of the machine and is secured to the center of the member 101. The member 101 acts like a trap door to enclose the tree trunk 99 within the machine. It may have a plywood edge facing 106 (FIG. 5) that closes against a framing edge 107 of the slot 80 and, on its top surface, a cushioned pad 108 of very compressible foam rubber about two inches thick. When in position across the slot 80, the member 101 slopes sideways toward a main conveyor 110, later to be described.

An important feature of the invention is the use of extendable canvas catchers 111 and 112 to more than double the collecting area by providing sloping catching portions which are relatively high up on the outside edges of the machine extending up and out at an angle of about 20° and therefore catch the fruit falling from the outside portion of the tree and direct it down over sloping floors 113, 114 (and partly over the member 101) into the main fore and aft collection conveyor 110. The canvas members 111 and 112 are normally rolled up like window shades (see FIGS. 4 and 5), in order to narrow the harvester when it is being moved, and are extended when harvesting (see FIGS. 1 and 2).

A hydraulic system is used to extend the canvases 111, 112 while a spring system is used to retract them. The hydraulic system uses a triple-extension cylinder 115, 116 for each canvas 111, 112. Each cylinder 115, 116 contains two other cylinders 117, 118 and 119, 120 telescoped inside each other successively, and a rod 121, 122 connected to the piston of the last cylinder 118, 120 is secured to a short rigid horizontal longitudinally extending member 123, 124. The members 123 and 124 are each connected at their ends by members 126, 127 to outer ends of respective stabilizing members 128, 129, about three feet long, which may be angle irons and are themselves welded to long stiff steel rods 130 and 131, which may be of ⅜" stock. A foam rubber pad 125 over the members 128, 129 protects the fruit from injury. The outer ends of the rods 130 and 131 and some other portions are secured by members 132, 133 to rods 134, 135 that are secured in tubular openings along the full edge 136, 137 of each canvas 111, 112.

Two strong long springs 138, 139 are provided, one extending from each end of the member 123 to a corner of the frame 20. These exert a strong pull on the member 123 sufficient to stabilize it.

Another steel rod assembly 140, 141 is positioned generally parallel to the central portion of the rod 130, 131 by two brackets 142, 143 which are welded to the stabilizing member 128, 129 and rod 130, 131 and have a slot 144, 145 slidably engaging the steel rod assembly 140, 141. Each such assembly 140, 141 comprises two rods 146, 147 and 148, 149 held together by a turnbuckle 150, 151 which engages their threaded ends. By tightening the turnbuckle 150, 151, the rods 146, 147, and 148, 149 are pulled toward each other. Their outer ends are secured to the rods 130, 131, so that the result of tightening the turnbuckle 150, 151 is to bow out the ends of the rods 130, 131, and also the rods 134 and 135, thereby bowing the canvases 111 and 112 to a concave shape. This helps to guide the fruit in toward the center and to keep it from falling off the outer edges.

Each canvas 111, 112 is rolled around a cylindrical core 152 and 153. Each core 152, 153 has a pulley winch 154, 155 around which is wound a cable 156, 157. The cable 156, 157 passes via a pulley 158, 159 to the opposite side of the frame 20 and is there secured to a spring 160, 161 inside a cylinder 162, 163. The cable 156, 157 stretches the spring 160, 161 when the canvas 111, 112 is extended. When the pressure is off the cylinders 115, 116, the springs 160, 161 retract the canvases 111, 112, and the springs 160, 161 assure that the canvases 111, 112 will be rewound around their respective cores 152, 153. When relaxed, the spring 160, 161 occupies about one-half the total length of its pipe 162, 163.

When the driver of the machine is to move the machine from tree to tree, the auxiliary operators retract these canvas members 111, 112, this being done in a matter of a few seconds by the springs 160, 161 upon release of the hydraulic pressure on the cylinders 115, 116, and then after moving to the next tree and positioning the machine around the tree, they extend the canvases 111, 112 by the hydraulic systems, using valves 164, 165 to act on the cylinders by conduit 166, 167. Thus the canvases 111, 112 are not in the way during movement of the machine from place to place and yet are easily expanded during the actual operation. Fruit that falls on the canvases 111, 112 when they are extended, rolls down them onto the sloping floors 113, 114 and down then to the central conveyor 110, crossing in some instances the member 101 on the way.

As the fruit rolls down the floors 113, 114, it is protected from damage by other falling fruit by a series of sloping baffles comprising foam-rubber louvers 170. Each louver 170 may be about seven inches wide, two inches thick and in such lengths as, put end to end, extend the length of the collecting portion of the frame 20. The foam rubber is adhered to a support, such as aluminum strips 171 about two inches wide. The frame 20 is provided with a series of supporting members 172 having a series of brackets 173, to which the strips 171 are bolted. The upper (and inner) edge 174 of each louver 170 is free to flex, being unsupported, while the lower (and outer) edge 175 is padded heavily. The louvers 170 are so soft that the falling fruit is not damaged and they let it fall gently off the lower edge 175 onto the base floors 113 and 114. When fruit in its fall strikes the unattached edge 174 of the louver, the shock of the fall normally depresses the free edge 174 downward, so if the fruit strikes a louver near its edge, the fruit has its fall partly broken and then normally falls to the louver 170 below and thence rolls downwardly and outwardly, over the outside edge 175 of the louver and to the cushioned floor 113 or 114, normally about five inches beneath the outward edge of the louver 90.

Both the floors 113 and 114 are preferably covered with about one half inch of sponge rubber to help avoid bruising and other damage to the fruit. All the louvers 170 slope outwardly to shorten the fall onto the floors 113 and 114, and there may be some sixteen to eighteen of them, covering nearly all the frame surface except where the trap door 101 covers the slot 80. Over the conveyor 110 is a framework 176, on which a foam rubber baffle or cushion 177 is secured in a vault-like shape, and any frame members that are not thereby covered are also padded.

The conveyor 110 (shielded from direct blows by the vaulted padding member 177) is located to one side of the slot 80 and is about fourteen inches wide; it conducts fruit rearwardly to the frame portion 31, where elevator means 180 is provided, as by a flighted conveyor, which carries the fruit up to the top to a rearwardly moving waist-high grading means 181. Both the elevator 180 and grader 181 may be the same belt, having holes therein. Small fruit falls through openings 182 in the grading belt and to the ground. Thus the fruit is automatically graded. It may then be filled in a bin 184 or it may be hand sorted while being moved about eight feet sideways on a belt 185 by a sorter. This man gets rid of split-pits and other defective fruit. From the far end of the belt 185, a diagonal bar 187 deposits the good fruit into a bin 184. The conveyors may all be hydraulically controlled and driven.

The bin 184 is carried on a fork-type platform 188, normally tilted in toward the machine by a hydraulic cylinder 190, controlled by the right rear operator by a valve 191 and conduit 192. As the bin 184 is loaded and becomes heavier it tilts the platform 188 outwardly, and finally engages the ground along one edge and slides off the platform 188. The bin 184 is left for a fork-lift pickup to get.

It will be apparent from the foregoing that there is no manual handling of the crop during harvesting—only some manual sorting out of bad fruit, the removal of tree props, and transfer of the bins, which are mainly handled mechanically. The machine itself is moved under its own power and has the power for shaking the tree, for its conveyors, and for all other principal operations. One tree at a time is harvested at the rate of a few minutes—two or three—per tree, and the fruit is left in bins ready to be picked up by a fork-lift truck.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting. For example, while this machine has been described primarily as used for picking peaches, plums, apricots and other soft fruit, it can, of course, be used for nuts too. If used exclusively for nuts, the louvers 170 and vault-like baffle 177 may be omitted, and padding is less important.

We claim:

1. A machine for harvesting drupes and the like from trees, including in combination:
   a main wheel-supported frame, having self-propelling means and steering means, said frame having a longitudinal axis and a forward end and a rear end, and an open slot extending in from said forward end along said longitudinal axis about half-way to said rear end,
   a tree-trunk engaging yoke, having a semi-encircling well-padded and cushioned collar, for gentle engagement of the trunk of a tree to be harvested,
   a carriage slidably mounted to said frame along said slot and carrying said yoke for fore-and-aft movement along said longitudinal axis,
   means secured to said frame and bearing against said carriage for urging said carriage to the front end of said frame and for enabling it to be pushed in by firm but gentle pressure to the rear end of said slot, so that said machine can engage a tree trunk and then advance and surround it by pushing against said trunk with said yoke while said frame advances,
   first drupe-catching means on said frame and stationary relative thereto on each side of said slot and to the rear thereof to present a substantially continuous drupe-catching area,
   second drupe-catching means mounted movably on said frame movable between a position where it bridges said slot after said yoke is at the rear end of said slot and a position where said slot is open, and
   means on said frame for moving said second drupe-catching means to bridge said slot so that said tree trunk is then completely encircled by drupe-catching means.

2. The machine of claim 1 having third and fourth drupe-catching means, one on each side of said frame, said third and fourth drupe-catching means being normally contracted so as to lie closely adjacent the side edges of said first drupe-catching means, to give said machine a relatively narrow normal width, and means for extending each of said third and fourth drupe-catching means out laterally of the frame, so that when both are extended the drupe-catching area is greatly extended widthwise.

3. The machine of claim 2 wherein said third and fourth drupe-catching means are extended out and up from a level substantially higher than said yoke, said third and fourth drupe-catching means when extended sloping inwardly toward the center of the frame.

4. The machine of claim 3 wherein said frame supports conveyor means extending lengthwise of said machine, toward which all said drupe-catching means slope, for moving caught drupes to one end of said frame.

5. The machine of claim 4 wherein said frame has: elevator means at the end of said conveyor means toward which said drupes are moved, size-grading means to which said elevator means brings said drupes, bin support means, a bin removably mounted on said bin support means, and means for discharging drupes of suitable size from said size-grading means to said bin.

6. The machine of claim 4 wherein said first said drupe-catching means comprises a sloped floor sloping from said third and fourth drupe-catching means to said conveyor means and baffle means above said floor for breaking the fall of drupes above said floor and for dropping said drupes gently to said floor so as to protect the drupes rolling down said floor from direct hits by drupes falling from the trees.

7. The machine of claim 6 wherein said baffle means includes a plurality of longitudinally extending louvers made essentially of thick foam rubber stiffened at one side edge each tilted upwardly from said one side edge to the other, toward the center of the machine, successive said louvers overlapping each other, louvers further from the center of the machine being higher than those nearer to said center, said louvers providing passage for fruit between each other and between themselves and said floor and flexing to let down drupes gently from their outer edges to a lower succeeding louver, the drupes normally rolling down and off the lower, outer edges of said louvers.

8. The machine of claim 7 wherein there is also a vault-like foam rubber baffle means over said main conveyor to protect the conveyed drupes from being struck by falling drupes.

9. The machine of claim 3 wherein said third and fourth drupe-catching means include means for arching the upper side edges thereof to help drupes to move in toward the center of the machine.

10. The machine of claim 1 having pneumatic tree-shaking means, comprising a hydraulically positionable telescoping arm, a tree-engaging collar at the outer end thereof, and pneumatic means for moving said collar back and forth rapidly.

11. The machine of claim 1 wherein said frame supports conveyor means extending lengthwise of said machine, toward which said first drupe-catching means slopes, for moving collected drupes to one end of said frame.

12. The machine of claim 11 wherein said conveyor means is succeeded successively, in order, by elevator means, size grading means, and discharge means, said machine having bin support means with a bin thereon into which said discharge means empties the drupes.

13. The machine of claim 11 having baffle means supported by said frame over said conveyor for preventing falling drupes from striking conveyed drupes, said baffle means being cushioned to avoid damage to the falling drupes.

14. A machine for harvesting fruit and the like from trees, including in combination:
   a main wheel-supported frame, having self-propelling means and steering means, said frame having a longitudinal axis, a forward end, and a rear end, a control platform on said rear end and an open slot extending in from said forward end along said longitudinal axis half-way to said control platform,
   a tree-trunk engaging yoke, having a semi-encircling cushioned collar, for gentle engagement of the trunk of a tree to be harvested, a carriage slidably mounted to said frame along said slot and carrying said yoke for fore-and-aft movement along said longitudinal axis, hydraulic means secured to said frame and bearing against said carriage for moving said carriage to the front end of said frame and for enabling it, when the hydraulic pressure is released, to be pushed in by firm but gentle pressure to the rear end of said slot, so that said machine can engage a tree trunk and then advance and surround it by pushing against said trunk with said yoke while said frame advances, conveying means on said frame for conveying collected fruit to said control platform, first fruit-catching means on said frame and stationary relative thereto on each side of said slot and to the rear thereof to present a substantially continuous fruit-catching area sloping toward said conveying means, second fruit-catching means mounted movably on said frame and normally positioned to one side of said slot and movable to bridge said slot after said yoke is at the rear end of said slot, said second fruit-catching means then sloping toward said conveying means, hydraulic means on said frame for moving said second fruit-catching means to bridge said slot so that said tree trunk is then completely encircled by fruit-catching means, and baffle means supported by said frame over said conveying means for protecting fruit on said conveying means from falling fruit.

15. The machine of claim 14 wherein said first fruit-collecting means includes a sloping floor for guiding collected fruit to said conveying means, and a plurality of longitudinally extending louvers, each comprising a wide strip of foam rubber stiffened at one side edge and tilted upwardly from said one side edge to the other, toward the center of the machine, successive said louvers being higher from the center out and overlapping each other and providing passage for fruit between each other and between themselves and said floor, and flexing to let down fruit gently from their outer edges to a lower succeeding louver, the fruit normally rolling down and off the lower, outer edges of said louvers.

16. The machine of claim 15 having third and fourth fruit-catching means, one on each side of said frame, each said third and fourth fruit-catching means comprising a canvas sheet normally rolled up at a level substantially higher than said yoke closely adjacent the side edges of said first fruit-catching means, to give said machine a relatively narrow normal width, and hydraulic means for extending each of said third and fourth fruit-catching means out laterally of the frame and upwardly, so that when both are extended the fruit-catching area is greatly extended widthwise and fruit collected on said third and fourth fruit-catching means rolls down said floor, protected by said louvers.

17. The machine of claim 16 having first spring means for retracting said third and fourth fruit-catching means when the pressure from the hydraulic means for extending them is released and for keeping said third and fourth fruit-catching means taut when extended, and second spring means for aiding the roll-up of said canvas sheets.

18. The machine of claim 14 wherein said control platform supports a size-grading belt at the rear of said conveyor means, bin support means at the rear of said frame, a bin on said bin support means, and means for conducting fruit meeting size specifications from said size-grading belt to said bin.

19. The machine of claim 18 wherein said means for conducting includes a sorting belt and said control platform has a seat for a sorter adjacent said sorting belt.

20. The machine of claim 14 having on said frame two seats, one at a rear corner, the other at a front corner diagonally opposite, each said seat being pivotally mounted for swinging horizontal movement, a hydraulic cylinder having a piston and rod being mounted to said seat for said swinging horizontal movement and pivoted to said seat for swinging vertical movement, control means at each said seat for swinging said seat and said cylinder, hydraulic means controlled from said seat for actuating said cylinder to extend said rod, tree-engaging means at the outer end of said rod, and pneumatic means controlled from said seat for shaking said tree-engaging means.

21. The machine of claim 20 having two canvas roll-out members, one at each edge of said fruit-catching means, hydraulic means at each seat for extending one said roll-out member to extend it out and up from the upper edge of said floor, and spring means for holding it taut when extended and for returning it to a rolled-up state when the extending hydraulic pressure is released.

22. A machine for harvesting drupes and the like from trees, including in combination:

a main wheel-supported frame, having self-propelling means and steering means, said frame having a longitudinal axis, a forward end, and a rear end, a platform at the rear end having a driver's seat and a first control seat in one corner, a forward harvesting portion and a second control seat forward of said harvesting portion diagonally opposite said rear control seat, and an open slot extending in from said forward end along said longitudinal axis about half-way to said platform, a tree-trunk engaging yoke, having a semi-encircling cushioned collar, for gentle engagement of the trunk of a tree to be harvested, a carriage mounted to said frame for movement along said slot and carrying said yoke for fore-and-aft movement along said slot, yieldable fluid-pressure means for urging said carriage normally to the front end of said forward portion and for enabling it to be pushed back therefrom along said slot by firm but gentle pressure, so that said machine can engage a tree trunk with said yoke and then by advancing surround the tree trunk, first fruit-catching means on said forward portion and stationary relative thereto on each side of said slot and to the rear thereof to present a substantially continuous fruit-catching area, a slidable second fruit-catching means on said forward portion adjacent to and normally withdrawn from said slot and movable into it when said yoke is at the rear end of said slot, means for moving said second fruit-catching means across said slot so that said tree trunk is completely encircled by said first and second fruit-catching means, a pair of pneumatic tree shaking means, each comprising a telescoping arm, a tree-engaging collar at the outer end thereof, hydraulic means for extending said arm, hydraulic means for swinging said arm around a pivot on said frame so as to position said collar against a tree limb, and control means for both said hydraulic means adjacent each of said first and second control seats, and a main conveyor extending lengthwise of said machine, toward which both said fruit-catching means slope.

23. The machine of claim 22 having means for causing said main conveyor to move collected drupes rearwardly of said machine, and a fruit handling system on and adjacent said platform comprising a grading belt, and a discharge belt, said machine having bin support means to the rear of said platform, and a bin on said support means into which said discharge belt empties the drupes.

24. The machine of claim 22 having a pair of fabric fruit collectors on each side of said frame to the outside of said first fruit-catching means, normally rolled tightly along the edge of said frame and hydraulic means operated from each of said first and second control seats for extending each said collector out laterally of the frame and upwardly so that when both are extended the fruit-catching area is greatly extended widthwise.

25. The machine of claim 24 having means for keeping said fabric collectors taut when extended and means for bowing them out somewhat at the center.

26. The machine of claim 25 having spring return means for said fabric collectors for rolling them up upon release of pressure from their hydraulic means.

References Cited
UNITED STATES PATENTS

| | | | |
|---|---|---|---|
| 2,729,199 | 1/1956 | Jones | 56—328 XR |
| 2,913,866 | 11/1959 | Curtis | 56—329 |
| 3,116,585 | 1/1964 | Triplett | 56—328 |
| 3,145,521 | 8/1964 | Herbst | 56—329 |
| 3,250,065 | 5/1966 | Frost | 56—329 |
| 3,347,032 | 10/1967 | Pool et al. | 56—329 |

RUSSELL R. KINSEY, Primary Examiner